United States Patent
Hesh et al.

(10) Patent No.: US 10,742,115 B1
(45) Date of Patent: Aug. 11, 2020

(54) SELF-REGULATING CURRENT CIRCUIT APPARATUS AND METHOD

(71) Applicant: United States of America as represented by the Administrator of NASA, Washington, DC (US)

(72) Inventors: Scott V. Hesh, Greenbackville, VA (US); Michael J. Mahon, Severna Park, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/352,959

(22) Filed: Mar. 14, 2019

(51) Int. Cl.
| | |
|---|---|
| *H02M 3/156* | (2006.01) |
| *H02M 3/158* | (2006.01) |
| *H02M 1/00* | (2006.01) |
| *H02M 3/04* | (2006.01) |
| *H02M 1/44* | (2007.01) |
| *B64G 1/64* | (2006.01) |
| *F42B 3/10* | (2006.01) |

(52) U.S. Cl.
CPC .............. *H02M 3/04* (2013.01); *B64G 1/645* (2013.01); *H02M 1/44* (2013.01); *F42B 3/10* (2013.01); *H02M 2001/0009* (2013.01)

(58) Field of Classification Search
CPC ....... H02M 3/158; H02M 2001/20009; H02M 3/156
See application file for complete search history.

(56) References Cited

U.S. PATENT DOCUMENTS

| | | | | |
|---|---|---|---|---|
| 2005/0242792 | A1* | 11/2005 | Zinn ..................... | H02M 3/158 323/268 |
| 2006/0119332 | A1* | 6/2006 | Elbanhawy ........... | H02M 3/156 323/273 |
| 2010/0177538 | A1* | 7/2010 | Scherr ................. | B60R 21/0173 363/39 |
| 2013/0020867 | A1* | 1/2013 | Hughes ............. | H02M 3/33507 307/17 |

(Continued)

FOREIGN PATENT DOCUMENTS

KR 20130068644 * 6/2013

OTHER PUBLICATIONS

Konrad R. Skup , "A Digital Controller for Satellite Medium Power DC/DC Converters", 2013 (Year: 2013).*

*Primary Examiner* — Adolf D Berhane
*Assistant Examiner* — Sisay G Tiku
(74) *Attorney, Agent, or Firm* — Christopher O. Edwards; Bryan A. Geurts; Helen M. Galus

(57) ABSTRACT

The present invention relates to an apparatus including a self-regulating current source, which utilizes a switching regulator to provide high efficiency power conversion and a high-side current monitor, but instead of driving the feedback input with a voltage divider to set the output voltage, the self-regulating current source utilizes a high-side current sense resistor with an operational amplifier optimized for current sensing, to drive the feedback input to the switching regulator, thereby creating a self-regulating constant current source. By adjusting the gain of the operational amplifier, the user can directly set the optimized current needed for using the apparatus in a variety of deployment devices, including satellite and pyrotechnic applications.

17 Claims, 1 Drawing Sheet

(56) References Cited

U.S. PATENT DOCUMENTS

| | | | |
|---|---|---|---|
| 2016/0036330 A1* | 2/2016 | Sturcken | H02M 3/1584 |
| | | | 323/271 |
| 2017/0201175 A1* | 7/2017 | Chen | H02M 1/08 |
| 2018/0035500 A1* | 2/2018 | Song | H03G 1/0005 |
| 2018/0159418 A1* | 6/2018 | Basu | H03K 17/04206 |
| 2019/0165676 A1* | 5/2019 | Nogawa | H02M 3/158 |

* cited by examiner

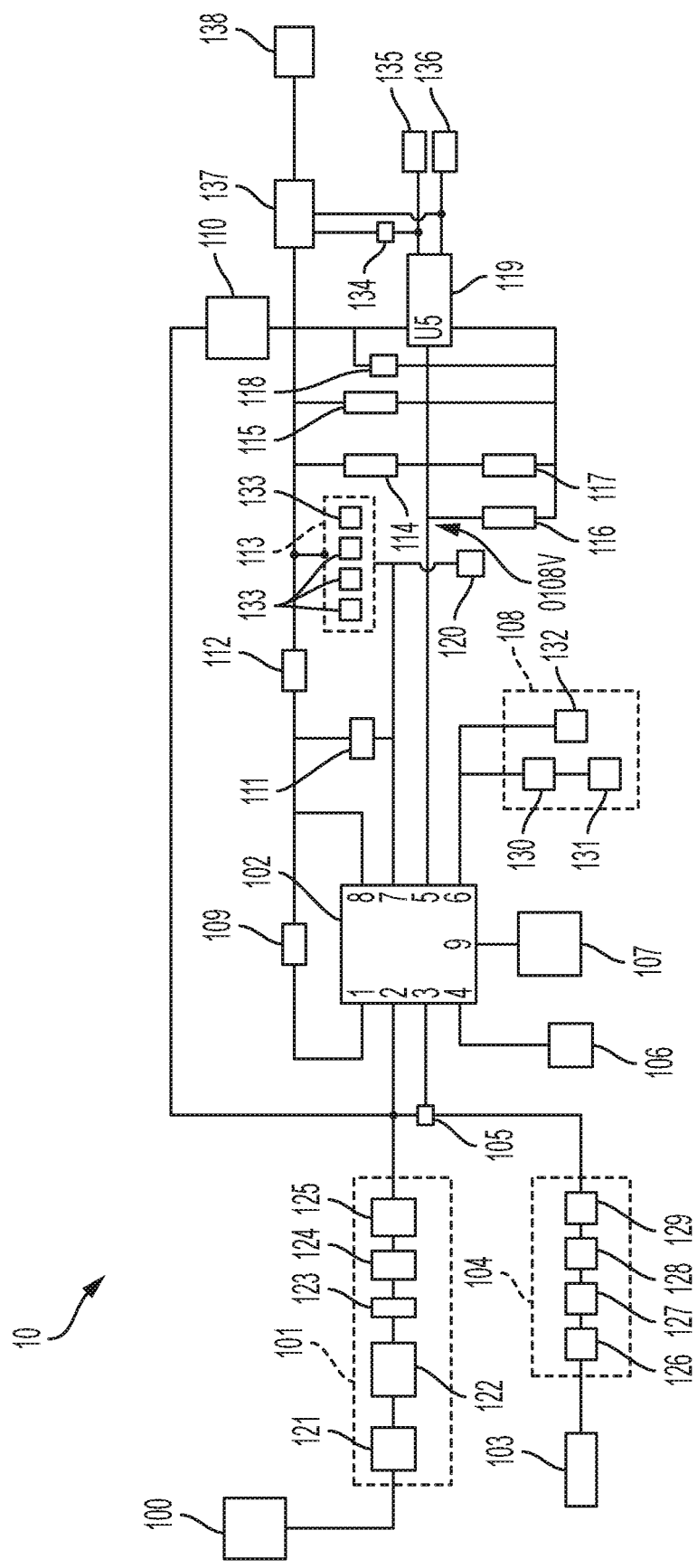

SELF-REGULATING CURRENT CIRCUIT APPARATUS AND METHOD

ORIGIN OF THE INVENTION

The invention described herein was at least in-part made by an employee of the United States Government and may be manufactured or used by or for the Government of the United States of American for governmental purposes without the payment of any royalties thereon or therefor.

BACKGROUND OF THE INVENTION

1. Field of the Invention

The present invention relates to an apparatus and method of a Self-Regulating Current Circuit used in a variety of environments and applications, including satellite deployment devices and pyrotechnic applications.

2. Description of the Related Art

The need for simple, reliable, and inexpensive release devices can be important to the success of a variety of fields, including satellite deployment devices and pyrotechnic applications. In particular, the ability for a single mechanism to accomplish many of these releases is a desirable trait among CubeSat users. Whether the mechanism is used to release antennas, solar arrays, deployable doors, or to safely activate pyrotechnic applications while in a hazardous environment (i.e., rocket motors, ordnance, etc.), an inexpensive, simple and reliable release mechanism is desired.

In particular, in satellite applications, CubeSats have grown into a class of satellites which are rapidly introducing new, inexpensive technologies in space. This ever-increasing complexity and functionality in a small package require numerous mechanisms and deployables in order to meet space mission requirements. Release mechanisms often add significant development costs to a satellite program and in the world of small satellites, such as CubeSats, the need for simple, reliable, and inexpensive release devices can be very important.

To that end, a spring-loaded nichrome burn wire solution has been utilized in standard CubeSats, for launching deployables in space. Nichrome, also known as nickel chrome, is an alloy produced by mixing nickel, chromium and, occasionally, iron. Best known for its heat resistance, as well as its resistance to both corrosion and oxidation, the alloy is incredibly useful for a number of applications. From space applications, industrial manufacturing, to hobby work, nichrome in the form of wire is present in a range of commercial products, crafts and tools.

In the CubeSats, the release mechanism for launching a deployable utilizes a compression spring system in order to apply a force and a stroke to the nichrome burn wire. When a constant current is applied to the nichrome wire, it will thermally cut through a tie down cable allowing it to release the deployable it had secured. The nichrome wire used on the mechanism is usually 30 AWG type thermocouple chromel cable with an allowable free length ranging.

Ni-chrome based deployment devices for space applications, such as satellites, require a relatively high amount of current to activate in both air and vacuum. An electrical circuit supplies a constant current to the nichrome wire independent of the resistance of the wire and the voltage available from the spacecraft. As long as the minimum required power was available from the spacecraft then the electrical circuit would supply a constant current to the nichrome wire.

Although the 30 AWG nichrome wire provided an acceptable margin relative to overheating in vacuum versus failing to thermally cut in air, the constant current source requires tight tolerances. In particular, Ni-chrome wires must be activated within a specified constant current for optimum performance. If too much current is applied, the wire could disintegrate, but if too little current is applied, there may not be enough heat to active the device; both situations resulting in deployment failure.

In the existing satellite deployment application, the minimum amount of current needed to reliably cut through the tie down cable in air was 1.40 Amps. The supplied current to the nichrome wire that would cause a failure due to overheating in vacuum was 1.90 Amps. Therefore, a constant current requirement of 1.60±0.05 Amps was used to provide margin on either side of the failure modes and was used to design the electrical circuit. This allowed the mechanism to successfully operate in both air and in vacuum without having to change any circuitry or software.

However, for satellite deployment devices utilizing a nichrome wire, there is often a need for a high-efficient constant-current source to activate the device which provides highly efficient power conversion and a high-side current monitor, and which simplifies the deployment of the circuit Further, in airborne and pyrotechnic applications, the need for an improved constant current technology for burn wire deployment devices, which can provide high-power high-reliable constant-current supply, is desired.

SUMMARY OF THE INVENTION

The present invention is directed to an apparatus and method of a Self-Regulating Current Circuit having a small, robust footprint that will integrate a constant current source need for simple, reliable, and inexpensive release devices in airborne and other environments, including satellite deployment devices and pyrotechnic applications.

In one embodiment, the apparatus of the present invention includes a Self-Regulating Current Circuit (SRC2), which is a current circuit which utilizes a Switching Regulator to provide high efficiency power conversion and a high-side current monitor, but instead of driving the feedback input with a voltage divider to set the output voltage, in one embodiment, the Self-Regulating Current Circuit (SRC2) utilizes a high-side current sense resistor with an Operational Amplifier optimized for current sensing, to drive the feedback input to the Switching Regulator, thereby creating a Self-Regulating constant current source. By adjusting the gain of the Operational Amplifier, the user can directly set the optimized current needed for using the SRC2 in a variety of deployment devices.

In one embodiment, an apparatus including a self-regulating constant current source, includes: a voltage input; a buck chip which receives the voltage input; an inductor which performs as a switching regulator for the buck chip, the buck chip which charges the inductor and sends energy through a load to a current output; an operational amplifier which receives input from the load; and a current sense resistor disposed between the load and the operational amplifier, the current sense resistor which is monitored by the operational amplifier; wherein the operational amplifier drives a feedback input of the buck chip and sets a feedback voltage, thereby controlling the current output; and a capacitor which stabilizes the current output of the operational amplifier in constant current mode.

In one embodiment, the voltage input includes a range of 6-39 volts.

In one embodiment, the apparatus further includes: an input electromagnetic interference (EMI) filter, the EMI filter including a plurality of capacitors, a ferrite bead, and an inductor, and which provides electromagnetic noise suppression from the voltage input as it enters the buck chip.

In one embodiment, the ferrite bead is combined with the plurality of capacitors to ground on either side of the ferrite bead and the inductor to form a low-pass filter network and provide noise suppression of the power supply.

In one embodiment, the apparatus further includes: an ON/OFF logic level including an enable (EN) on the buck chip and an enable from the power supply, the enable from the power supply which includes circuitry which enables the EN on the buck chip to turn the buck chip ON/OFF.

In one embodiment, the apparatus further includes: a frequency compensation which sets a switching frequency of a frequency set resistor on the buck chip.

In one embodiment, the apparatus further includes: a power pad ground on the buck chip, which sinks heat to ground.

In one embodiment, the apparatus further includes: a boot strap connected to the buck chip, the boot strap which leads to the inductor; and a switching regulator at the buck chip which performs charging of the inductor.

In one embodiment, the apparatus further includes: stabilizing circuitry including a plurality of capacitors which stabilize an output voltage to the load; and a plurality of resistors disposed between the stabilizing circuitry and the load, and which loads the output voltage.

In one embodiment, the buck chip includes a ground pin which leads to ground and to the stabilizing circuitry.

In one embodiment, the voltage input leads to the operational amplifier and a capacitor which decouples the voltage input to the operational amplifier.

In one embodiment, the apparatus further includes: a feedback pin of the buck chip which samples the current output and sets the output voltage.

In one embodiment, the output current is set to 1.67 A at the load.

In one embodiment, the current sense monitor determines a gain of the operational amplifier, to set the current output, which is determined at the load.

In one embodiment, the apparatus further includes: a plurality of current monitors which monitor the input to the operational amplifier from the load and the current sense monitor, in order to monitor the output current at the load.

In one embodiment, the inductor provides power conditioning at the operational amplifier.

In one embodiment, the self-regulating current source is utilized in release systems or ordinance systems in at least one of space, airborne, or pyrotechnic applications, including at least one of satellites, CubeSats, orbital vehicles, missiles, unmanned aerial vehicles, balloons, aircraft applications, launch ranges, rocket motors, separation systems, or recovery systems.

In one embodiment, a satellite release system includes the self-regulating constant current source.

In one embodiment, a pyrotechnic application includes the self-regulating constant current source.

In one embodiment, a method of self-regulating a constant current source, includes: charging an inductor on a buck chip, the inductor which acts as a switching regulator, and sending energy through a load to a current output; receiving input from the load into an operational amplifier; monitoring the operational amplifier using a current sense resistor; driving a feedback input of the buck chip using the operational amplifier to set a feedback voltage, thereby controlling the current output; and stabilizing the current output of the operational amplifier in constant current mode.

In one embodiment, the method further includes: adjusting a gain of the operational amplifier to set the current output, which is determined at the load.

In one embodiment, the method further includes: monitoring the input to the operational amplifier in order to monitor the output current at the load.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawing is only one exemplary embodiment of the disclosure and not to be considered as limiting in scope.

The FIGURE depicts a schematic diagram of a Self-Regulating Current Circuit apparatus, according to one embodiment consistent with the present invention.

DESCRIPTION OF THE INVENTION

The present invention is directed to an apparatus and method of a Self-Regulating Current Circuit having a small, robust footprint that will integrate a constant current source need for simple, reliable, and inexpensive release devices in airborne and other environments, including satellite deployment devices and pyrotechnic applications.

In one embodiment, the apparatus of the present invention includes a Self-Regulating Current Circuit (SRC2), which is a current circuit which utilizes a Switching Regulator to provide high efficiency power conversion and a high-side current monitor, but instead of driving the feedback input with a voltage divider to set the output voltage, in one embodiment, the Self-Regulating Current Circuit (SRC2) utilizes a high-side current sense resistor with an Operational Amplifier optimized for current sensing, to drive the feedback input to the Switching Regulator, thereby creating a Self-Regulating constant current source. By adjusting the gain of the Operational Amplifier, the user can directly set the optimized current needed for using the SRC2 in a variety of deployment devices.

In one embodiment, the SRC2 of the present invention simplifies the deployment of the circuit as circuit resistance associated with wire and interfaces are negated via the self-regulating circuit.

Additionally, due to the high efficiency nature of the SRC2, the entire circuit can be miniaturized, for example, to take up<1" length×1" width×0.1" height of real-estate, but still provide, for example, up to three (3) Amps of constant current needed for nichrome-based deployment devices.

More specifically, the FIGURE generally shows one embodiment of an apparatus 10 which includes a Self-Regulating Current Source (SRC2), set on a printed circuit board, for example, and which utilizes a high-side current sense resistor with Operational Amplifier feedback. In one embodiment, the input 100 of the SRC2 device 10 includes a 6-39V range input (for example, the range which is set to what input voltage pin (VIN) 2 of buck chip 102 can accommodate). In one embodiment, the input voltage proceeds from the input 100 through an input electromagnetic interference (EMI) filter 101, which includes a plurality of capacitors 121, a ferrite bead 122, a capacitor 123, an inductor 124, and a plurality of capacitors 125. The EMI filter 101 provides electromagnetic noise suppression from the voltage input 100 as it enters the chip 102. In one embodiment, the ferrite bead 122 is combined with the capacitors 121,123, and 125, to ground on either side of the bead 122 and the inductor 124, to form a low-pass filter network, reducing the high frequency power supply noise.

In one embodiment, an ON/OFF logic level 104 is provided to turn the buck chip 102 ON/OFF via enable (EN) pin 3 of chip 102. In one embodiment, the enable 103 from the power supply (for example, from a 28V battery pack used in a space application), allows a current limiting resistor 126, and a capacitor 127, diode 128, and resistor 129—to enable (EN) pin 3 and turn the chip 102 ON/OFF.

In one embodiment, if the native power source differs from the exemplary 28V, then the current limiting resistor 126 and resistor 129 of the ON/OFF logic level 104 can be changed. In one embodiment, these resistors 126, 129 could be discarded altogether, or could be structured such that any time a voltage is applied, it passes through in an open circuit to buck converter 110. In that embodiment, the current limiting resistor 126 could be removed and placed with resistor 105, which allows enabling.

In one embodiment, at pin 6 of chip 102, a chip required frequency compensation 108 includes a resistor 130 and capacitor 131, and another capacitor 132, which sets the switching frequency of the frequency set resistor 106 at pin 4 of the buck chip 102, to 400 KHz, for example. However, the frequency can be set to an exemplary 500 KHz frequency, and this arbitrary choice can be made by the user as appropriate.

In one embodiment, a power pad ground 107 is at pin 9, and sinks heat to ground.

In one embodiment, a boot strap 109 at pin 1 of buck chip 102, leads to a primary inductor 112, as does switching regulator at pin 8 of the buck chip 102. The switching regulator from pin 8 charges the inductor 112 and sends energy through load 137—i.e., acts as a switching regulator.

In one embodiment, a stabilizing circuitry 113 including a plurality of capacitors 133, stabilizes the output to the load 137. In one embodiment, ground pin 7 of buck chip 102 leads to ground 120 and to the stabilizing circuitry 113. Between the stabilizing circuitry 113 and the load 137, a plurality of resistors 114, 117, and 115, provide a slight load on the output voltage. Capacitor 116 stabilizes the output of the operational amplifier 119 at U5 in constant current mode.

In one embodiment, to set a static voltage, that output voltage setting is $V_{out}=0.8\ (1+R_{117}/R_{114})$, which determines the load at U5 of the operational amplifier 119. This circuitry determines how the voltage is set on a voltage regulator like a buck converter.

In one embodiment, the Input Voltage (Vin), leads to pin 2 of chip 102 and to inductor/filter 110, and to operational amplifier 119. That voltage leads to the operational amplifier 119 and capacitor 118. Capacitor 118 decouples the input voltage to operational amplifier 119.

In one embodiment, pin 5 of buck chip 102, is a feedback pin which samples the output and sets the voltage output. In this arrangement, the buck chip 102 acts like a traditional buck converter, but in actuality, the operational amplifier 119 sets the feedback voltage, thereby controlling the output current over load 137 and output 138.

In one embodiment, the output current is set to 1.67 A at output 138, but this setting can be higher depending on the user's choice. In one embodiment, resistor 134, which along with the resistor 117, determines the operational amplifier 119 gain to set the constant current output which is determined at 137 by $Load=(0.8*(R_{in}/R_{out}))/R_{load}$.

In one embodiment, the input of the operational amplifier 119 can be sampled via 135, 136, to monitor output current at load 137.

Accordingly, the present invention provides an apparatus 10 with a novel operational amplifier 119 feedback, in a Self-Regulating Current Circuit. The buck chip 102 acts as a switching regulator, the inductor 112 is an energy storage, and the input EMI filter 101 limits noise from the back-feeding into the supply system since the present invention is a switch-mode power supply. In one embodiment, the filter inductor 110 at pin 8 is used to lead to operational amplifier 119 and to provide power conditioning.

In one embodiment, high-side monitors are included, where high power current sense resistor $R_{load}$ 137 is monitored by the operational amplifier 119, which in turn drives the buck chip's 102 feedback pin 5. In one embodiment, a high-power input current sensor monitors the load of the entire system.

In one embodiment, on board integrated circuits (ICs) capture diagnostic data that can monitor the device's 10 health via an external telemetry system.

In one embodiment, input supervision is performed by monitoring input power for over-voltage, under-voltage, or reverse polarity. If the input power is out of specification, the device 10 will not turn on thereby providing input power protection.

The device 10 of the present invention, due to its small size and being ruggedized for airborne and space-based applications, is useful for space-based CubeSats (i.e., solar panel deployment mechanisms) and small satellites. Since the present invention accepts high input voltage, includes input EMI filtering, embeds diagnostic housekeeping data, and has multiple outputs, it is particularly useful for airborne applications.

Due to the present invention's efficient provision of constant current, the present invention is also useful for high altitude balloons (deployment mechanism and power regulation) and sounding rockets (deployment mechanisms).

In one embodiment, the present invention is also useful for pyrotechnic applications, and is useful to overcome the problem of line resistance in ordnance systems.

In particular, traditional high reliable ordnance systems typically utilize Capacitive Discharge Ignition (CDI) to discharge energy from a large capacitor or capacitor bank to initiate a pyrotechnic device. This method is very effective but requires large firing capacitors as well as for the ordnance system to be located no further than 1.6Ω of line resistance from the pyrotechnic device, any further and the system is in jeopardy of not having enough energy stored in the capacitor to reliably actuate the device.

The present invention would overcome these limitations by delivering a regulated current source greater than 5 A to actuate any typical pyrotechnic events such as rocket motors, separation systems, recovery systems, etc. This would allow a much smaller and lighter system as well as the ability to have a single system capable of firing pyrotechnic through multiple interfaces as opposed to multiple ordnance systems located throughout the vehicle.

The present invention could also easily be ported to orbital vehicles, missiles, UAVs, balloons, aircraft applications, and launch ranges to safely actuate pyrotechnic devices through extended harnessing and/or interfaces by overcoming land-line losses.

As noted above, the present invention's switching DC/DC converter capable of 5-6 amps, a feedback regulation circuit, and dual inhibits, would provide improved abilities for pyrotechnic applications.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. An apparatus including a self-regulating constant current source, comprising:
   a voltage input;
   a buck chip which receives said voltage input;
   an inductor which performs as a switching regulator for said buck chip, said buck chip which charges said inductor and sends energy through a load to a current output;
   an operational amplifier which receives input from said load; and
   a current sense resistor disposed between said load and said operational amplifier, said current sense resistor which is monitored by said operational amplifier;
   wherein said operational amplifier drives a feedback input of said buck chip and sets a feedback voltage, thereby controlling said current output;
   a capacitor which stabilizes said current output of said operational amplifier in constant current mode;
   a boot strap connected to said buck chip, said boot strap which leads to said inductor;
   a switching regulator at said buck chip which performs said charging of said inductor;
   stabilizing circuitry including a plurality of capacitors which stabilize an output voltage to said load; and
   a plurality of resistors disposed between said stabilizing circuitry and said load, and which loads said output voltage.

2. The apparatus of claim 1, wherein said voltage input includes a range of 6-39 volts.

3. The apparatus of claim 1, further comprising:
   an input electromagnetic interference (EMI) filter, said EMI filter including a plurality of capacitors, a ferrite bead, and an inductor, and which provides electromagnetic noise suppression from said voltage input as it enters said buck chip.

4. The apparatus of claim 3, wherein said ferrite bead is combined with said plurality of capacitors to ground on either side of said ferrite bead and said inductor to form a low-pass filter network and provide noise suppression of said power supply.

5. The apparatus of claim 4, further comprising:
   an ON/OFF logic level including an enable (EN) on said buck chip and an enable from said power supply, said enable from said power supply which includes circuitry which enables said EN on said buck chip to turn said buck chip ON/OFF.

6. The apparatus of claim 1, further comprising:
   a frequency compensation which sets a switching frequency of a frequency set resistor on said buck chip.

7. The apparatus of claim 1, further comprising:
   a power pad ground on said buck chip, which sinks heat to ground.

8. The apparatus of claim 1, wherein said buck chip includes a ground pin which leads to ground and to said stabilizing circuitry.

9. The apparatus of claim 1, wherein said voltage input leads to said operational amplifier and the capacitor which decouples said voltage input to said operational amplifier.

10. The apparatus of claim 1, further comprising:
    a feedback pin of said buck chip which samples said current output and sets said output voltage.

11. The apparatus of claim 10, wherein said output current is set to 1.67 A at said load.

12. The apparatus of claim 1, wherein said current sense monitor determines a gain of said operational amplifier, to set said current output, which is determined at said load.

13. The apparatus of claim 12, further comprising:
    a plurality of current monitors which monitor said input to said operational amplifier from said load and said current sense monitor, in order to monitor said output current at said load.

14. The apparatus of claim 1, wherein said inductor provides power conditioning at said operational amplifier.

15. The apparatus of claim 1, wherein the self-regulating current source is utilized in release systems or ordnance systems in at least one of space, airborne, or pyrotechnic applications, including at least one of satellites, CubeSats, orbital vehicles, missiles, unmanned aerial vehicles, balloons, aircraft applications, launch ranges, rocket motors, separation systems, or recovery systems.

16. A satellite release system comprising the self-regulating constant current source of claim 1.

17. A pyrotechnic application comprising the self-regulating constant current source of claim 1.

* * * * *